US012212923B2

(12) United States Patent
Leng et al.

(10) Patent No.: US 12,212,923 B2
(45) Date of Patent: Jan. 28, 2025

(54) FIRST-ORDER DIFFERENTIAL MICROPHONE ARRAY WITH STEERABLE BEAMFORMER

(71) Applicant: Northwestern Polytechnical University, Shaanxi (CN)

(72) Inventors: Xin Leng, Shaanxi (CN); Jingdong Chen, Shaanxi (CN)

( * ) Notice: Subject to any disclaimer, the term of this patent is extended or adjusted under 35 U.S.C. 154(b) by 202 days.

(21) Appl. No.: 17/926,608

(22) PCT Filed: Feb. 10, 2021

(86) PCT No.: PCT/CN2021/076435
§ 371 (c)(1),
(2) Date: Nov. 20, 2022

(87) PCT Pub. No.: WO2022/170541
PCT Pub. Date: Aug. 18, 2022

(65) Prior Publication Data

US 2023/0209252 A1 Jun. 29, 2023

(51) Int. Cl.
*H04R 1/40* (2006.01)
*G10L 21/0208* (2013.01)
(Continued)

(52) U.S. Cl.
CPC .......... *H04R 1/406* (2013.01); *G10L 21/0208* (2013.01); *H04R 3/005* (2013.01);
(Continued)

(58) Field of Classification Search
None
See application file for complete search history.

(56) References Cited

U.S. PATENT DOCUMENTS 6,041,127 A 3/2000 Elko
9,508,357 B1 11/2016 Krishnaswamy
2021/0058702 A1 * 2/2021 Shumard ................ H04R 19/04

FOREIGN PATENT DOCUMENTS

CN 102771144 A 11/2012
CN 112073873 A 12/2020
WO 2020059977 A1 3/2020

OTHER PUBLICATIONS

International Search Report and Written Opinion dated Nov. 9, 2021 received in PCT/CN2021/076435, p. 8.

(Continued)

*Primary Examiner* — Kenny H Truong
(74) *Attorney, Agent, or Firm* — Zhong Law, LLC

(57) ABSTRACT

A first-order differential microphone array (FODMA) with a steerable beamformer is constructed by specifying a target beampattern for the FODMA at a steering angle θ and then decomposing the target beampattern into a first sub-beampattern and a second sub-beampattern based on the steering angle θ. A first sub-beamformer and a second sub-beamformer are generated to each filter signals from microphones of the FODMA, wherein the first sub-beamformer is associated with the first sub-beampattern, and the second sub-beamformer is associated with the second sub-beampattern. The steerable beamformer is then generated based on the first sub-beamformer and the second sub-beamformer. The decomposing of the target beampattern into a first sub-beampattern and a second sub-beampattern includes dividing the target beampattern into a sum of a first-order cosine (cardioid) first sub-beampattern and a first-order sinusoidal (dipole) second sub-beampattern.

14 Claims, 9 Drawing Sheets

(51) Int. Cl.
*G10L 21/0216* (2013.01)
*H04R 3/00* (2006.01)
*H04R 5/027* (2006.01)

(52) U.S. Cl.
CPC .... *H04R 5/027* (2013.01); *G10L 2021/02166* (2013.01); *H04R 2201/401* (2013.01)

(56) References Cited

OTHER PUBLICATIONS

Elko et al., "A Steerable and Variable First-Order Differential Microphone Array," IEEE International Conference on Acoustics, Speech, and Signal Processing, Apr. 24, 1997, pp. 1-4.

Borra et al., "Uniform Linear Arrays of First-Order Steerable Differential Microphones," IEEE/ACM Transactions on Audio, Speech, and Language Processing, vol. 127, No. 12, Dec. 31, 2019, pp. 1-16.

* cited by examiner

800A

800B

800C

900A

900B

FIRST-ORDER DIFFERENTIAL MICROPHONE ARRAY WITH STEERABLE BEAMFORMER

CROSS-REFERENCE TO RELATED APPLICATIONS

This application is the U.S. national stage of PCT/CN2021/076435 filed Feb. 10, 2021, which is hereby incorporated in reference in its entirety.

TECHNICAL FIELD

This disclosure relates to differential microphone arrays and, in particular, to constructing a first-order differential microphone array (FODMA) with steerable differential beamformers.

BACKGROUND

A differential microphone array (DMA) uses signal processing techniques to obtain a directional response to a source sound signal based on differentials of pairs of the source signals received by microphones of the array. DMAs may contain an array of microphone sensors that are responsive to the spatial derivatives of the acoustic pressure field generated by the sound source. The microphones of the DMA may be arranged on a common planar platform according to the microphone array's geometry (e.g., linear, circular, or other array geometries).

The DMA may be communicatively coupled to a processing device (e.g., a digital signal processor (DSP) or a central processing unit (CPU)) that includes circuits programmed to implement a beamformer to calculate an estimate of the sound source. A beamformer is a spatial filter that uses the multiple versions of the sound signal captured by the microphones in the microphone array to identify the sound source according to certain optimization rules. A beampattern reflects the sensitivity of the beamformer to a plane wave impinging on the DMA from a particular angular direction. DMAs combined with proper beamforming algorithms have been widely used in speech communication and human-machine interface systems to extract the speech signals of interest from unwanted noise and interference.

BRIEF DESCRIPTION OF THE DRAWINGS

The present disclosure is illustrated by way of example, and not by way of limitation, in the figures of the accompanying drawings.

DETAILED DESCRIPTION

Figure 1:
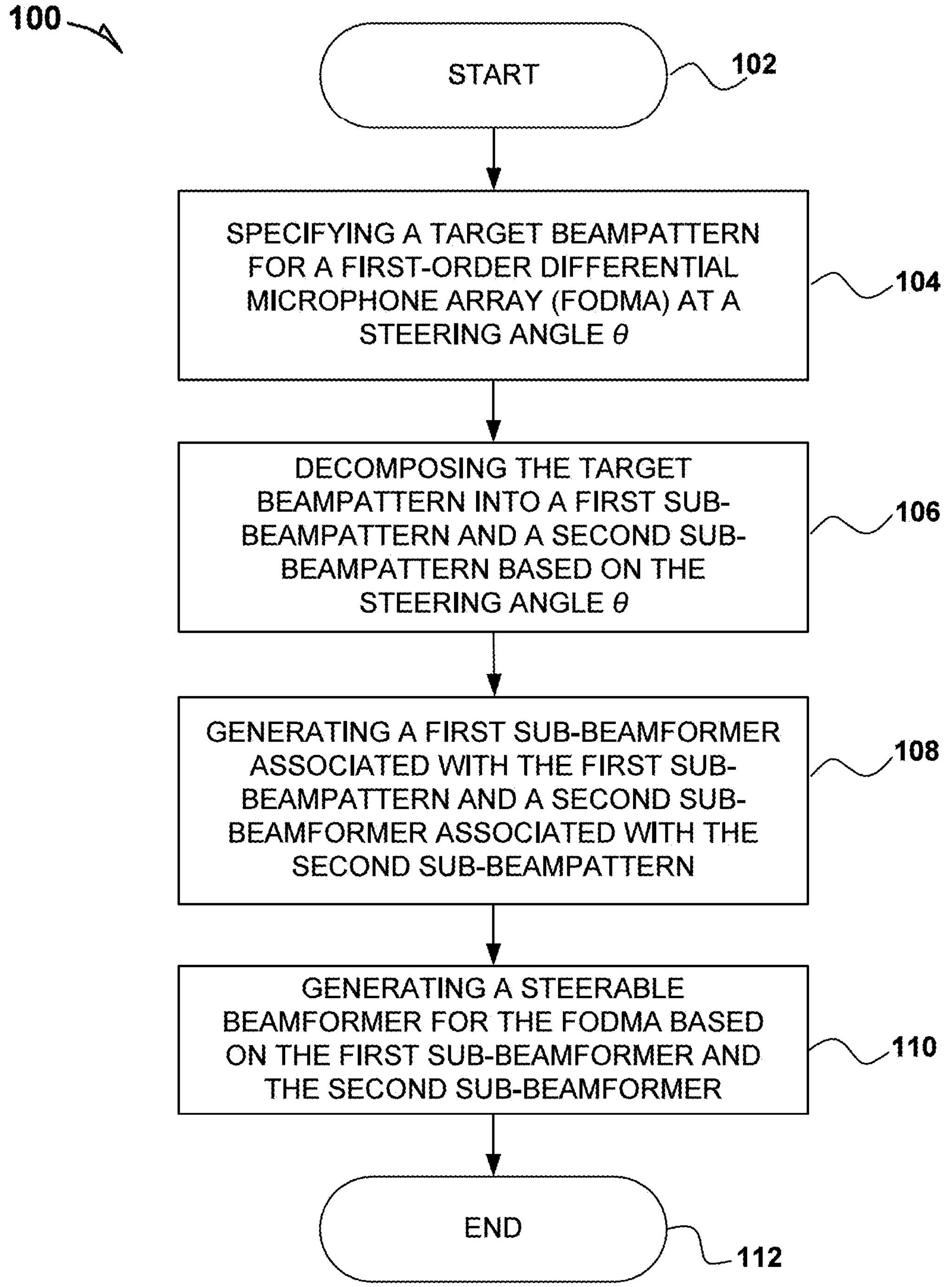
FIG. 1 is a flow diagram illustrating a method for constructing a first-order differential microphone array (FODMA) with steerable beamformers, according to an implementation of the present disclosure.

DMAs may measure the derivatives (at different orders) of the sound signals captured by each microphone, where the collection of the sound signals forms an acoustic field associated with the microphone arrays. For example, a first-order DMA beamformer, formed using the difference between a pair of microphones (either adjacent or non-adjacent), may measure the first-order derivative of the acoustic pressure field. A second-order DMA beamformer may be formed using the difference between a pair of two first-order differences of the first-order DMA. The second-order DMA may measure the second-order derivatives of the acoustic pressure field by using at least three microphones. Generally, an $N^{th}$ order DMA beamformer may measure the $N^{th}$ order derivatives of the acoustic pressure field by using at least N+1 microphones.

A beampattern of a DMA can be quantified in one aspect by the directivity factor (DF) which is the capacity of the beampattern to maximize the ratio of its sensitivity in the look direction to its averaged sensitivity over the whole space. The look direction is an impinging angle that the desired sound source comes from. The DF of a DMA beampattern may increase with the order of the DMA. However, a higher order DMA can be very sensitive to noise generated by the hardware elements of each microphone of the DMA itself, where the sensitivity is measured according to a white noise gain (WNG). The design of a beamformer for the DMA may focus on finding an optimal beamforming filter under some criteria (e.g., beampattern, DF, WNG, etc.) for a specified array geometry (e.g., linear, circular, square, etc.).

First-order differential microphone arrays (FODMAs), which combine a small-spacing uniform linear array and a first-order differential beamformer, have been used in a wide range of applications for sound and speech signal acquisition. In applications such as hearing aids and Bluetooth headsets, the direction of the sound source may be assumed and beamformer steering is not really needed. However, in many other applications, such as smart TVs, smart phones, tablets, etc., a steerable beamformer may be desired as the sound source position may not impinge along the endfire direction. For example, an LDMA may be mounted along the bottom side of a smart TV with voice recognition capabilities in order to form a beampattern along the broadside of the smart TV. Therefore, it would be useful to be able to steer the beamformer for such an LDMA in order to maximize signal acquisition (e.g., a user's voice) and noise reduction.

The present disclosure provides an approach to the design of a linear differential microphone array (LDMA) with steerable beamformers. The approach described herein includes dividing the target beampattern into a sum of two sub-beam patterns, e.g., a cardioid and a dipole, where the summation is controlled by the steering angle. Two sub-beamformers are constructed, the first one is similar to the traditional beamformer and is used to achieve the cardioid sub-beampattern while the second one is designed to filter the squared observation signals and is used to approximate the dipole sub-beampattern. The design of the second sub-beamformer is focused on the estimation of the spectral amplitude of the signal of interest while de-emphasizing the spectral phase, which is commonly accepted in speech enhancement and noise reduction.

Methods

For simplicity of explanation, methods are depicted and described as a series of acts. However, acts in accordance with this disclosure can occur in various orders and/or concurrently, and with other acts not presented and described herein. Furthermore, not all presented acts may be required to implement the methods in accordance with the disclosed subject matter. In addition, the methods could alternatively be represented as a series of interrelated states via a state diagram or events. Additionally, it should be appreciated that the methods disclosed in this disclosure are capable of being stored on an article of manufacture to facilitate transporting and transferring such methods to computing devices. The term article of manufacture, as used herein, is intended to encompass a computer program accessible from any computer-readable device or storage media. In an implementation, the methods may be performed by a hardware processing associated with the LDMA 300 of FIG. 3.

FIG. 1 is a flow diagram illustrating a method 100 for constructing a first-order differential microphone array (FODMA) with steerable beamformers, according to an implementation of the present disclosure. As described herein, the steerable beamformer refers to a beamformer that may be steered away from the endfire direction of the FODMA.

Referring to FIG. 1, at 102, a processing device may start executing operations to construct a first-order differential microphone array (FODMA) with steerable beamformers, such as determining a signal model.

Figure 3:
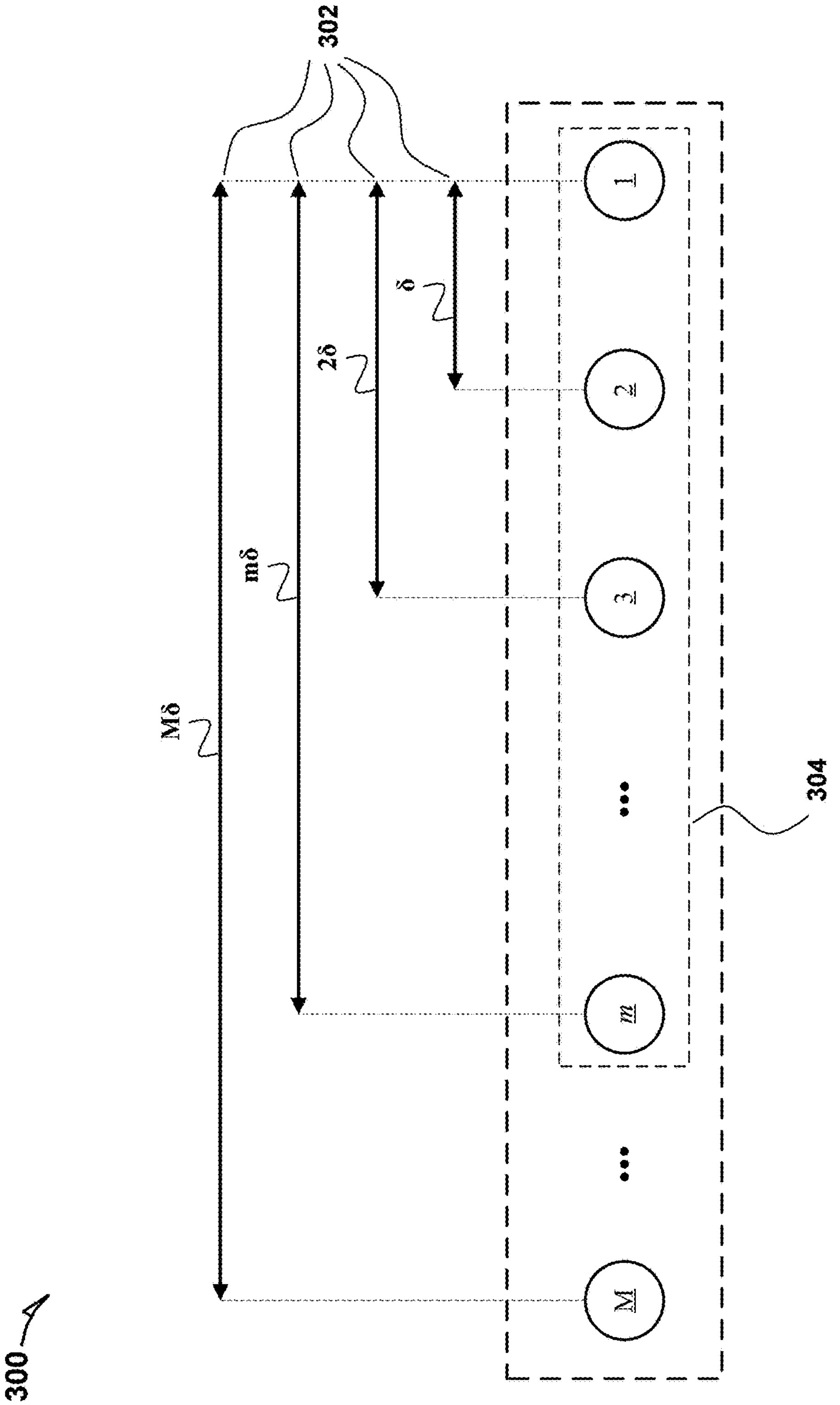
FIG. 3 shows an array geometry for the microphones of the FODMA arranged as a uniform linear differential microphone array (LDMA), according to an implementation of the present disclosure.

In an implementation, a uniform linear array composed of M microphones may be used to capture a signal of interest, e.g., LDMA 300 of FIG. 3. In the frequency domain, the received signal at the $m^{th}$ microphone, $m=1, 2, \ldots, M$, can be expressed as:

$$Y_m(\omega)=X_m(\omega)+V_m(\omega)=X(\omega)e^{-j(m-1)\omega\tau_0\cos\theta}+V_m(\omega), \tag{1}$$

where $X(\omega)$ is the signal of interest (also referred to as the desired signal) received at the first microphone, $X_m(\omega)$ and $V_m(\omega)$ are, respectively, the speech and additive noise signals received at the $m^{th}$ microphone, j is the imaginary unit with $j^2=-1$, $\omega=2\pi f$ is the angular frequency, $f>0$ denotes the temporal frequency, $\tau_0=\delta/c$, $\delta$ is the microphone spacing, c is the speed of sound in the air, which is generally assumed to be 340 m/s, and $\theta$ is the source incidence angle. In DMAs, it is assumed that the spacing $\delta$ is much smaller than the smallest acoustic wavelength of the frequency band of interest such that $\omega\tau_0\leq 2\pi$. For example, in the simulations and experiments described below, values of $\delta=1$ cm and $\delta=1.1$ cm are used for the spacing of the FODMA microphones. Since $\cos\theta$ is an even function, the beam patterns of linear arrays are symmetric with respect to the line that connects all the sensors. Therefore, in the following description, the range of $\theta$ may be limited to $[0, \pi]$.

Traditionally, beamforming is achieved by applying a linear spatial filter, $h(\omega)$, to the microphone observation signals, i.e., $$Z(\omega)=\sum_{m=1}^{M}H^*_m(\omega)Y_m(\omega)=h^H(\omega)y(\omega)=X(\omega)h^H(\omega)d(\omega, \cos\theta)+h^H(\omega)v(\omega) \tag{2}$$

where $$y(\omega)\triangleq[Y_1(\omega),Y_2(\omega)\ldots Y_m(\omega)]^T \tag{3}$$

is the observation signal vector, $v(\omega)$ is the noise signal vector defined analogously to the observation signal vector $y(\omega)$, $$d(\omega, \cos\theta)\triangleq[1,e^{-j\bar{\omega}},\ldots e^{-j(M-1)\bar{\omega}}]^T \tag{4}$$

is a phase vector, the superscripts * and $^H$ denote, respectively, the complex-conjugate and transpose-conjugate operators, $\bar{\omega}=\omega\tau_0\cos\theta$, $^T$ is the transpose operator, and $Z(\omega)$ is an estimate of $X(\omega)$. An objective of beamforming is to determine an optimal filter under certain criteria so that $Z(\omega)$ is a good estimate of $X(\omega)$.

At 104, the processing device may specify a target beampattern for the FODMA at a steering angle $\theta$.

With linear microphone arrays and the traditional beamforming approach, as described above at (2), the beampattern of an FODMA may lack steering flexibility, i.e., its main lobe may be difficult to steer to directions other than the linear endfire directions. In one implementation, to steer the main lobe to any direction in the range of $\theta\in[0, \pi]$, the target frequency-independent beampattern of FODMA may be expressed as:

$$B_1(\theta)=a_0+a_1\cos\theta+a_2\sin\theta \tag{5}$$

where $a_0$, $a_1$, and $a_2$ are real coefficients that determine the shape of the target beampattern for the FODMA.

At 106, the processing device may decompose the target beampattern into a first sub-beampattern and a second sub-beampattern based on the steering angle $\theta$.

The target beampattern for the FODMA may be decomposed into two sub-beam patterns $B_{1,1}(\theta)+B_{1,2}(\theta)$ wherein:

$$B_{1,1}(\theta)=a_0+a_1\cos\theta, \tag{6}$$

$$B_{1,2}(\theta)=a_2\sin\theta=a_2\sqrt{1-\cos\theta}, \tag{7}$$

which are a first-order cosine (cardiod) pattern and a first-order sinusoidal (dipole) pattern, respectively. If $a_2=0$, this target beampattern degenerates to one particular case in equation (2) above. Based on the properties of a Fourier series expansion, any first-order beampattern, which is continuous in [0, 2π], may be represented by target beampattern (5). At the main lobe (or desired steering) direction $\theta=\theta_d$, the target beampattern should be distortionless, i.e., $B_1(\theta_d)=1$. Therefore, the following two conditions are satisfied:

$$a_0+a_1\cos\theta+a_2\sin\theta\leq 1 a_0+a_1\cos\theta_d+a_2\sin\theta_d=1 \quad (8)$$

Given the target beampattern in equation (5) above, the problem of differential beamforming becomes one of finding the beamforming filter, h(ω) in (2), so that the resulting beampattern resembles the target beampattern.

At 108, the processing device may generate a first sub-beamformer and a second sub-beamformer to each filter signals from microphones of the FODMA, where the first sub-beamformer is associated with the first sub-beampattern, and the second sub-beamformer is associated with the second sub-beampattern.

The processing device may generate the two sub-beamformers $h_1(\omega)$ and $h_2(\omega)$, the outputs of which may be denoted as:

$$Z_1(\omega)=\Sigma_{m=1}^{M_1}H^*_{1,m}(\omega)Y_m(\omega)=h_1^H(\omega)y_1(\omega)=X(\omega)h_1^H(\omega)d_1(\omega,\cos\theta)+h_1^H(\omega)v_1(\omega), \quad (9)$$

$$Z_2(\omega)=\Sigma_{m=1}^{M_2}H^*_{2,m}(\omega)Y_m^2(\omega)=h_2^H(\omega)y_2^{(2)})(\omega)=X^2(\omega)h_2^H(\omega)d_2^{(2)}(\omega,\cos\theta)+h_2^H(\omega)v_2^{(2)}(\omega)+X(\omega)h_2^H(\omega)[d_2(\omega,\cos\theta)\odot v_2(\omega)], \quad (10)$$

where $\{M_1,M_2\}\leq M, h_1(\omega)$ and $h_2(\omega)$ are defined similarly to $h(\omega), y_1(\omega)\triangleq[Y_1(\omega),Y_2(\omega)\ \ldots\ Y_{M_1}(\omega)]^T$, (11)

$$y_2^{(2)}(\omega)[Y_1^2(\omega),Y_2^2(\omega)Y_{M_2}^2(\omega)]^T, \quad (12)$$

$v_1(\omega)$ is defined analogously to $y_1(\omega)$, $v_2^{(2)})(\omega)$ is defined similarly to $y_2^{(2)}(\omega)$, ⊙ denotes the Hadamard product (element-wise product), $$d_1(\omega,\cos\theta)\triangleq[1,e^{-j\overline{\omega}},\ \ldots\ e^{-j(M_1-1)\omega}]^T, \quad (13)$$

$$d_2^{(2)}(\omega,\cos\theta)\triangleq[1,e^{-2\overline{\omega}},\ \ldots\ e^{-j2(M_2-1)\overline{\omega}}]^T, \quad (14)$$

are the two phase vectors, and $d_2(\omega, \cos\theta)$ is defined analogously to $d_1(\omega, \cos\theta)$.

At 110, the processing device may, generate the steerable beamformer based on the first sub-beamformer and the second sub-beamformer.

Given $Z_1(\omega)$ and $Z_2(\omega)$, the estimate of the desired signal, X(ω), may be obtained as:

$$Z(\omega)=[|Z_1(\omega)|+\sqrt{|Z_2(\omega)|}]e^{j\phi_1(\omega)} \quad (15)$$

wherein $\phi_1(\omega)$ is the spectral phase of the output of the sub-beamformer $h_1(\omega)$ (the original noisy phase or an estimate of the phase of the clean speech spectrum may also be used). The spectral phase is a phase having little impact on the quality of the estimated signal. Based on equations (9) and (10) above, the beam patterns of the two sub-beamformers may be defined as:

$$B_1[h_1(\omega),\theta]\triangleq|d_1^H(\omega,\cos\theta)h_1(\omega)|, \quad (16)$$

$$B_2[h_2(\omega),\theta]\triangleq\sqrt{|d_2^{(2)H}(\omega,\mathrm{COS}\theta)h_2(\omega)|}, \quad (17)$$

Equation (17) used to define the beampattern for the second sub-beamformer (e.g., $h_2(\omega)$), is based on equation (10) above which filters squared signals from the observation signal vector (e.g., $y_2^{(2)}(\omega)$). In an implementation, the cross term in (10) may be neglected, which should not affect the validity of the beampattern because the signal of interest and any noise signals are assumed to be uncorrelated.

Therefore, the overall beampattern of the designed beamformer is:

$$B_d(\theta)=B_1[h_1(\omega),\theta]+B_2[h_2(\omega),\theta], \quad (18)$$

Given the above formulation, the beamforming in an implementation of this disclosure includes the construction of the filters $h_1(\omega)$ and $h_2(\omega)$ (e.g., the first and second sub-beamformers) in an optimal way such that their combination (e.g., the steerable beamformer for the FODMA) results in a beampattern $B_d(\theta)$, e.g., (18) above, which resembles the target beampattern given in equation (5) above.

The two sub-beamformers $h_1(\omega)$ and $h_2(\omega)$ may be determined according to the null-constrained method, which is widely used in the design of differential beamformers. Based on $M_1\geq 2$, $h_1(\omega)$ may be constructed using the following linear system of:

$$D(\omega)h_1(\omega)=\beta_1, \quad (19)$$

wherein $$D(\omega)\triangleq[d_1(\omega,1)d_1(\omega,-1)]^H, \quad (20)$$

$$\beta_1\triangleq[a_0+a_1 a_0-a_1]^T. \quad (21)$$

The minimum-norm solution of equation (19) may be expressed as:

$$h_{1,MN}(\omega)=D^H(\omega)[D(\omega)D^H(\omega)]^{-1}\beta_1. \quad (22)$$

Then, based on $M_2\geq 3$, $h_2(\omega)$ may be constructed using the following linear system of:

$$T(\omega)h_2(\omega)=\beta_2, \quad (23)$$

wherein $$T(\omega)\triangleq[d_2^{(2)}(\omega,1)d_2^{(2)}(\omega,0)d_2^{(2)}(\omega,-1)]^H, \quad (24)$$

$$\beta_2\triangleq[0\ a_2 0]^T \quad (25)$$

The minimum-norm solution of equation (23) may be expressed as:

$$h_{2,MN}(\omega)=T^H(\omega)[T(\omega)T^H(\omega)]^{-1}\beta_2. \quad (26)$$

In the particular case of $M_1=2$ and $M_2=3$, from (22) and (26):

$$h_{1,DI}(\omega)=D^{-1}(\omega)\beta_1, \quad (27)$$

$$h_{2,DI}(\omega)=T^{-1}(\omega)\beta_2, \quad (28)$$

wherein "DI" denotes the "direct inverse".

At 112, the processing device may end the execution of operations to construct a FODMA with a steerable beamformer.

Figure 2:
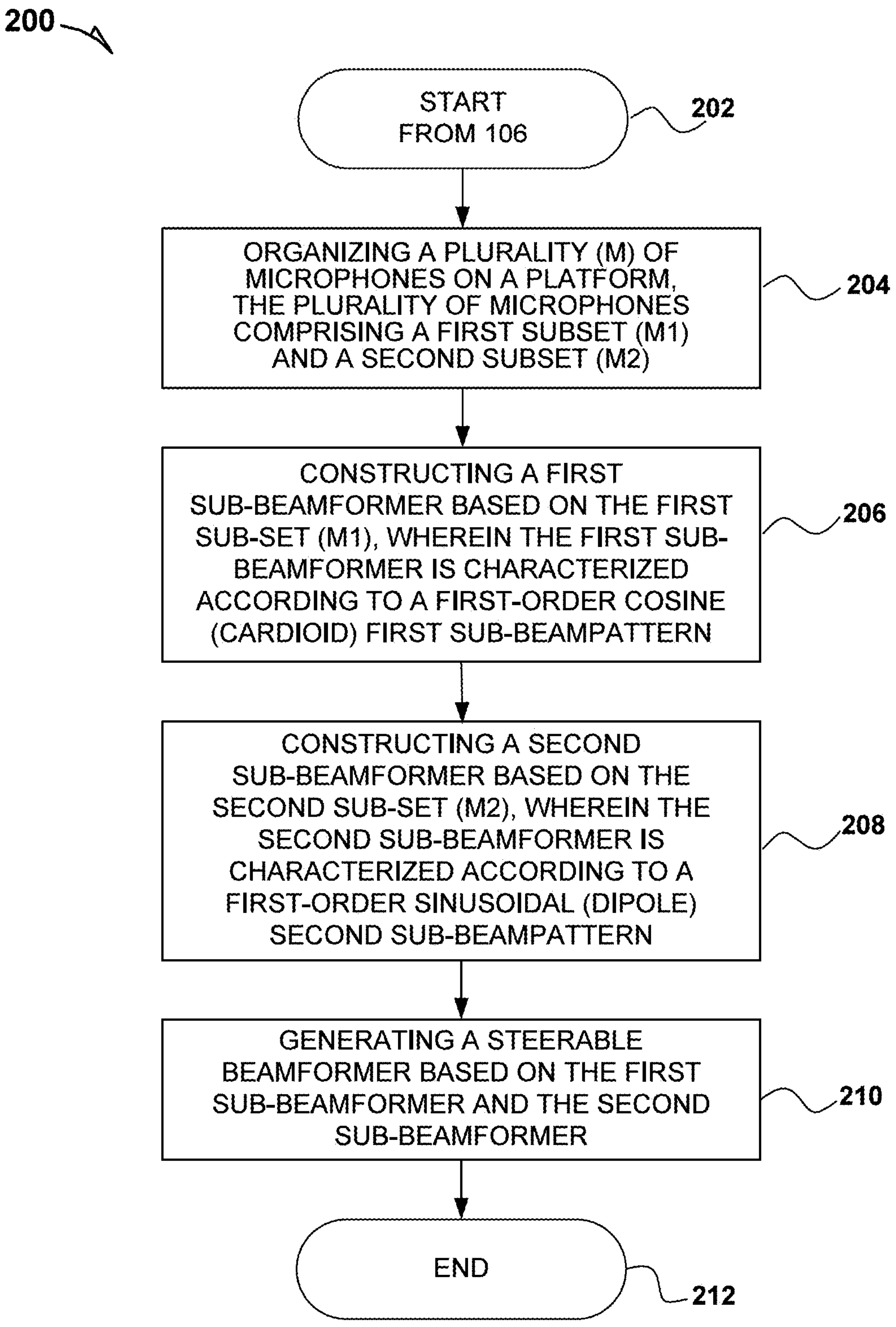
FIG. 2 is a flow diagram illustrating a method for constructing a first-order differential microphone array (FODMA) with steerable beamformers, according to an implementation of the present disclosure.

FIG. 2 is a flow diagram illustrating a method 200 for constructing a first-order differential microphone array (FODMA) with a steerable beamformers, according to an implementation of the present disclosure. As noted above, the steerable beamformer refers to a beamformer that may be steered away from the endfire direction of the FODMA.

Referring to FIG. 2, at 202, a processing device may start executing operations to construct a first-order differential microphone array (FODMA) with a steerable beamformer, such as determining a signal model.

As noted above, with respect to FIG. 1, a uniform linear array composed of M microphones may be used to capture a signal of interest, e.g., LDMA 300 of FIG. 3. In the frequency domain, the received signal at the $m^{th}$ microphone, m=1, 2, . . . , M, may be expressed according to equation (1) above.

Traditionally, beamforming is achieved by applying a linear spatial filter, h(ω), to the microphone observation signals, i.e., equations (2), (3) and (4) above. As noted above, an objective of beamforming is to determine the optimal filter, h(co), so that the filtered signals from the microphones of the FODMA match the signals of interest from the sound source (e.g., a human voice).

At 204, a plurality (M) of microphones may be organized on a substantially planar platform, the plurality of microphones comprising a first subset ($M_1$) of microphones and a second subset ($M_2$) of microphones.

As described more fully below with respect to FIG. 3, the FODMA may include uniformly distributed microphones (1,2, . . . , m, . . . , M) that are arranged according to a linear array geometry on a common plenary platform. As noted above with respect to the output of the two sub-beamformers $h_1(\omega)$ and $h_2(\omega)$ (see equations (9) and (10) above), signals from a set of microphones are used for each beamformer respectively, with $h_1(\omega)$ using microphones from 1 to $M_1$ and $h_2(\omega)$ using microphones from 1 to $M_2$ where $\{M_1, M_2\} \le M$, and { } is the union operator.

At 206, a processing device may construct a first sub-beamformer based on the first sub-set ($M_1$) of microphones and a target beampattern at a steering angle θ, wherein the first sub-beamformer is characterized according to a first-order cosine (cardioid) first sub-beampattern.

With linear microphone arrays and the traditional beamforming approach, as described above at (2), the beampattern of a FODMA may lack steering flexibility, i.e., its main lobe may be difficult to steer to directions other than the linear endfire directions. As noted above, in one implementation, to steer the main lobe to any direction in the range of $0 \in [0, \pi]$, the target frequency-independent beampattern of FODMA may be expressed according to (5) where $a_0$, $a_1$, and $a_2$ are real coefficients that determine the shape of the target beampattern for the FODMA.

As described above, the target beampattern for the FODMA may be decomposed into two sub-beam patterns $B_{1,1}(\theta)+B_{1,2}(\theta)$ according to (6) and (7) which are a first-order cosine (cardiod) pattern and a first-order sinusoidal (dipole) pattern, respectively.

The processing device may generate the two sub-beamformers $h_1(\omega)$ and $h_2(\omega)$, the output of the first sub-beamformer may be denoted as shown above at (9):

$$Z_1(\omega)=\Sigma_{m=1}^{M_1} H^*_{1,m}(\omega) Y_m(\omega)=h_1^H(\omega) y_1(\omega)=X(\omega) h_1^H(\omega) d_1(\omega, \cos\theta)+h_1^H(\omega) v_1(\omega),$$

where $M_1$ is a subset of $M$, $h_1(\omega)$ is defined similarly to $h(\omega)$, $$y_1(\omega) \triangleq [Y_1(\omega), Y_2(\omega) \ldots Y_{M_1}(\omega)]^T,$$

as noted at (11), $v_1(\omega)$ is defined analogously to $y_1(\omega)$, and $$d(\omega, \cos\theta) \triangleq [1, e^{-j\bar{\omega}}, \ldots e^{-j(M_1-1)\bar{\omega}}]^T,$$

as described at (13) is a phase vector.

At 208, the processing device may construct a second sub-beamformer based on the second sub-set ($M_2$) of the microphones and the target beampattern at the steering angle θ, wherein the second sub-beamformer is characterized according to a first-order sinusoidal (dipole) second sub-beampattern.

As described above, the target beampattern for the FODMA may be decomposed into two sub-beam patterns $B_{1,1}(\theta)+B_{1,2}(\theta)$ according to (6) and (7) which are a first-order cosine (cardiod) pattern and a first-order sinusoidal (dipole) pattern, respectively.

The processing device may generate the two sub-beamformers $h_1(\omega)$ and $h_2(\omega)$, the output of the second sub-beamformer may be denoted as shown above at (10):

$$Z_2(\omega)=\Sigma_{m=1}^{M_2} H^*_{2,m}(\omega) Y_m^{2}(\omega)=h_2^H(\omega) y_2^{(2)}(\omega)=X^2(\omega) h_2^H(\omega) d_2^{(2)}(\omega, \cos\theta)+h_2^H(\omega) v_2^{(2)}(\omega)+X(\omega) h_2^H(\omega)[d_2(\omega, \cos\theta) \odot v_2(\omega)],$$

where $M_2$ is a subset of $M$, $h_2(\omega)$ is defined similarly to $h(\omega)$, $$y_2^{(2)}(\omega) \triangleq [Y_1^{2}(\omega), Y_2^{2}(\omega) \ldots Y_{M_2}^{2}(\omega)]^T,$$

as noted at (12), $v_2^{(2)}(\omega)$ is defined similarly to $y_2^{(2)})(\omega)$, $\odot$ denotes the Hadamard product (element-wise product), $$d_2^{(2)}(\omega, \cos\theta) \triangleq [1, e^{-2\bar{\omega}}, \ldots e^{-j2(M_2-1)\bar{\omega}}]^T,$$

as described at (14) is a phase vector, and $d_2(\omega, \cos\theta)$ may be defined analogously to $d_1(\omega, \cos\theta)$.

At 210, the processing device may, generate the steerable beamformer based on the first sub-beamformer and the second sub-beamformer.

Given $Z_1(\omega)$ and $Z_2(\omega)$, the estimate of the desired signal, X(ω), may be obtained as described above at (15). The beam patterns of the two sub-beamformers may be defined as shown at (16) and (17) and therefore, the overall beampattern of the designed beamformer is:

$$B_d(\theta)=B_1[h_1(\omega),\theta]+B_2[h_2(\omega),\theta],$$

as shown at (18) above. Given the above formulation, the beamforming in an implementation of this disclosure includes the construction of the filters $h_1(\omega)$ and $h_2(\omega)$ (e.g., the first and second sub-beamformers) in an optimal way so that their combination (e.g., the steerable beamformer) results in a beampattern $B_d(\theta)$, e.g., (18) above, which resembles the target beampattern given in equation (5) above.

At 212, the processing device may end the execution of operations to construct a FODMA with a steerable beamformer.

System

FIG. 3 shows an array geometry for the microphones of the FODMA 300 arranged as a uniform linear differential microphone array (LDMA), according to an implementation of the present disclosure.

FODMA 300 may include uniformly distributed microphones (1,2, . . . , m, . . . , M) that are arranged according to a linear array geometry on a common plenary platform. The locations of these microphones may be specified with respect to a reference point (e.g., microphone 1). The coordinates of the microphones (2, . . . , m, . . . , M) of FODMA 300 may be specified by a distance ms, with m=1,2, . . . , M−1, which denotes the spacing between the $m^{th}$ microphone of the FODMA 300 and the specified reference point: microphone 1 of the FODMA 300 which is at 0 distance from itself. Accordingly, the vector $\rho=[0, \delta, 2\delta, \ldots, m\delta, \ldots, (M-1)\delta]^T$ may be used to denote an array geometry 302 of the microphones (1,2, . . . , m, . . . , M) of FODMA 300, where $^T$ is the transpose operator. It may be assumed that the maximum distance between two adjacent microphones (e.g., $\delta_{max}$) will be smaller than the wavelength of an impinging sound wave.

As noted above with respect to the output of the two sub-beamformers $h_1(\omega)$ and $h_2(\omega)$ (see equations (9) and (10) above), signals from a set of microphones are used for each beamformer respectively, with $h_1(\omega)$ using microphones from 1 to $M_1$ and $h_2(\omega)$ using microphones from 1 to $M_2$ where $\{M_1, M_2\} \leq M$, and { } is the union operator. Accordingly, the two sub-beamformers $h_1(\omega)$ and $h_2(\omega)$ may either use all of the M microphone sensors of FODMA 300 or a subset (e.g., subarray 304) of the M microphone sensors.

Simulations and Experiments

Figure 4A:
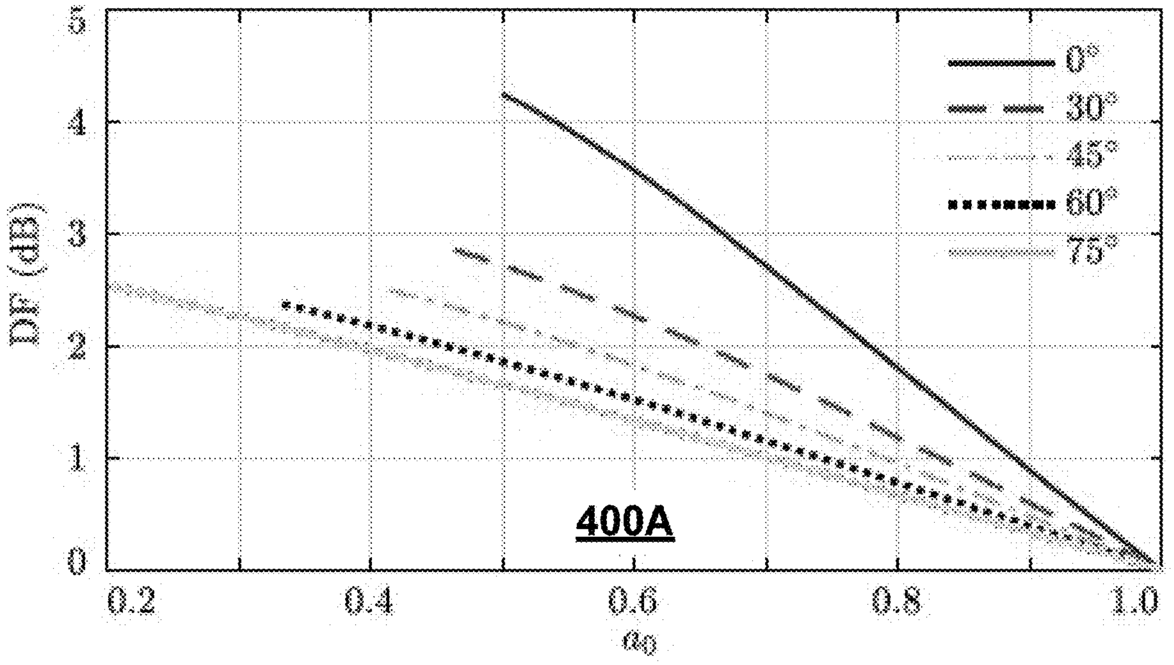
FIG. 4A shows a graph of DF values for the FODMA as a function of a coefficient of the target beampattern, according to an implementation of the present disclosure.

FIG. 4A shows a graph 400A of DF values for the FODMA as a function of a coefficient of the target beampattern, according to an implementation of the present disclosure.

For an effective or valid target beampattern, the coefficients in equation (5) above should satisfy the condition in (8) above. In order to determine the coefficients $a_0$, $a_1$, and $a_2$, considering the cases:

$$a_0>0, 0<a_1\leq a_0, \text{ and } a_2\geq 0, \tag{29}$$

such that the target beampattern $B_1(\theta)$ may be decomposed as:

$$B_1(\theta)=B_{1,1}(\theta)+B_{1,2}(\theta), \tag{30}$$

with $B_{1,1}(\theta)\geq 0$ and $B_{1,2}(\theta)\geq 0$. Based on the conditions in (29) above being satisfied, it may be determined that for any value of $a_1$: $B_{1,1}(a_1, \theta)=B_{1,1}(-a_1, \pi-\theta)$.

Furthermore, taking derivative of equation (5) above with respect to θ, and equating the result to zero, we obtain:

$$\tan\theta_d = \frac{a_2}{a_1}. \tag{31}$$

Combining conditions (8) and (31) it may be determined that:

$$a_0+a_1(\cos\theta_d+\tan\theta_d \sin\theta_d)=1. \tag{32}$$

The directivity factor (DF) of $B_1(\theta)$ may then be calculated as:

$$G_1 \triangleq \frac{B_1^2(\theta_d)}{\frac{1}{\pi}\int_0^\pi B_1^2(\theta)d\theta} = \frac{\pi}{\int_0^\pi [a_0 + a_1\cos\theta + a_2\sin\theta]^2 d\theta} = \frac{2\pi}{\pi\left(2a_0^2 + a_1^2 + a_2^2\right) + 8a_0a_2}, \tag{33}$$

which increases as the value of $a_0$ decreases. Substituting equations (31) and (32) into (33), it may be shown that the DF depends not only on the coefficients $a_0$ and $a_1$, but also on the steering angle $\theta_d$.

Graph 400A of FIG. 4A plots the DF as a function of $a_0$. The starting point of $a_0$ at each ed is set by making $a_0=a_1$, which gives the maximum DF. It is clearly shown that the DF decreases as the value of $\theta_d$ increases. As a result, $a_0=a_1$ is used as the criterion for all the following simulations and experiments described in the present disclosure.

Figure 4B:
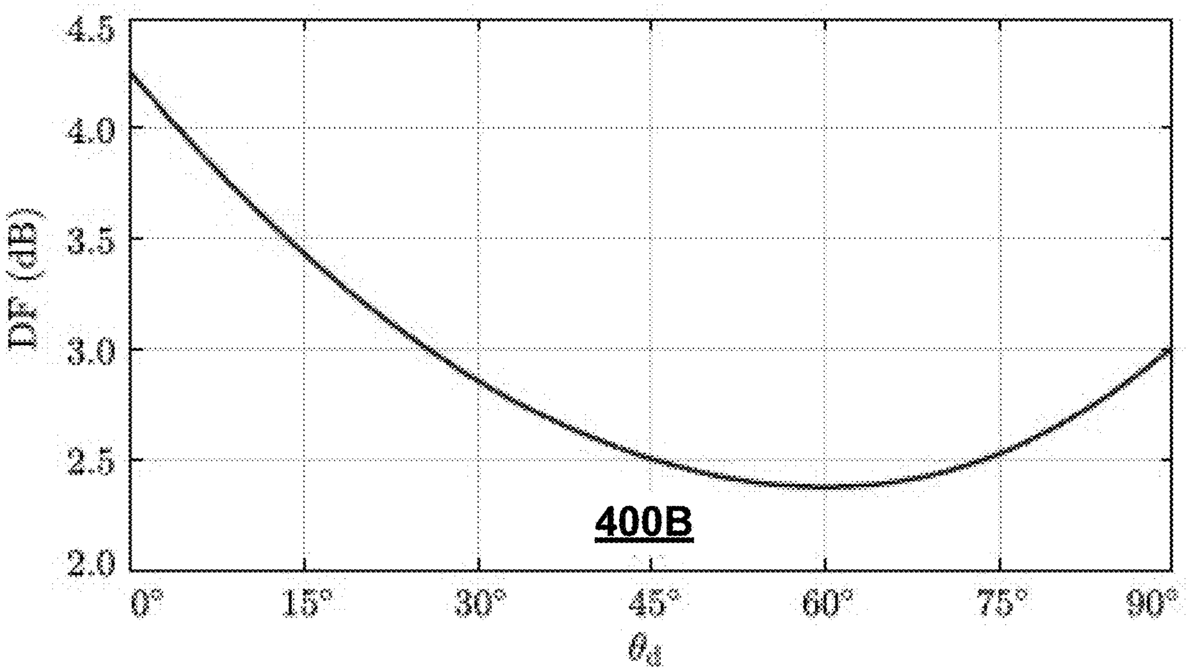
FIG. 4B shows a graph of DF values for the FODMA as a function of a selected steering angle, according to an implementation of the present disclosure.

FIG. 4B shows a graph 400B of DF values for the FODMA as a function of a steering angle, according to an implementation of the present disclosure.

Graph 400B of FIG. 4B plots the maximal DF as a function of $\theta_d$. The DF decreases first and then increases as $\theta_d$ changes from 0 to π/2, where the maximum value is at $\theta_d=0$, and the minimum value is at $\theta_d=\pi/3$.

Based on the results shown in graphs 400A and 400B, of FIG. 4A and FIG. 4B respectively, the values of $a_0$, $a_1$, and $a_2$ may be determined according to:

$$\begin{cases} a_0 = a_1 = (1 + \cos\theta_d + \tan\theta_d\sin\theta_d)^{-1} \\ a_2 = a_1\tan\theta_d \end{cases} \tag{34}$$

For example, if $\theta_d=\pi/4$, then $a_0=a_1=a_2=\sqrt{2}-1$, and $G_1=2.51$ dB. In such a case, $B_{1,1}(\theta)$ is a scaled cardioid and $B_{1,2}(\theta)$ is a scaled dipole along the direction π/2.

It should be noted that the aforementioned decomposition of a FODMA beampattern may be generalized to the general case of higher orders. Based on the multistage structure in the construction of DMAs, the response of a general $N^{th}$-order DMA is equal to the product of N FODMAs' responses:

$$B_N(\theta)=\prod_{n=1}^{N}(a_{n,0}+a_{n,1}\cos\theta+a_{n,2}\sin\theta). \tag{35}$$

Figure 5A:
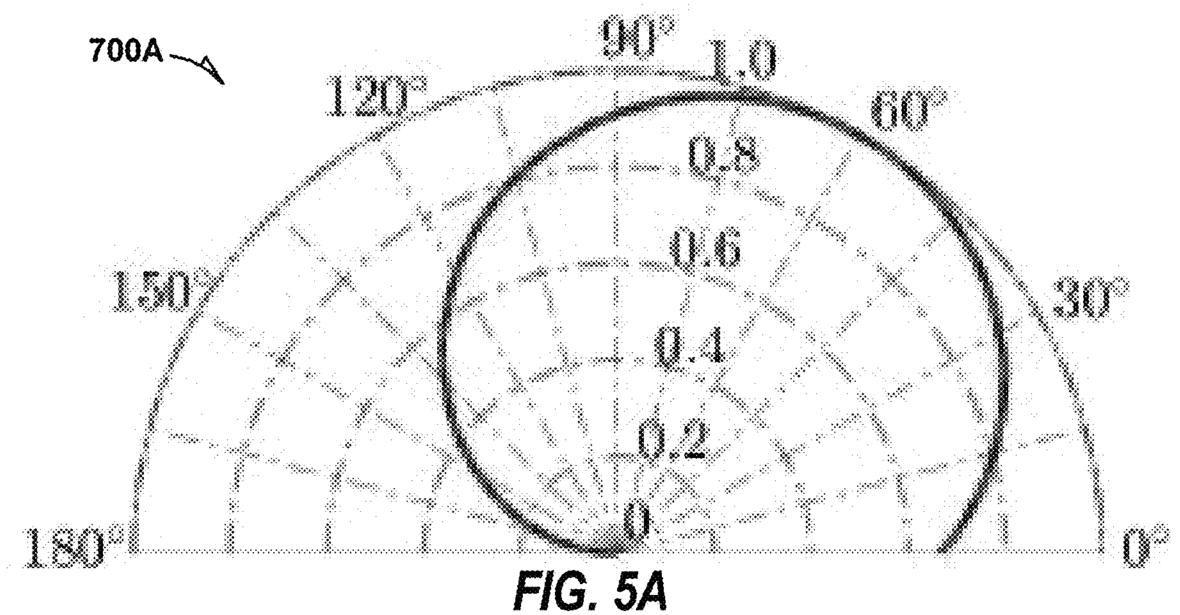
FIG. 5A shows a graph of a beampattern for the FODMA at a selected steering angle, according to an implementation of the present disclosure.

FIG. 5A shows a graph 500A of a beampattern for the FODMA at a selected steering angle, according to an implementation of the present disclosure.

For the purpose of studying the performance of the method described herein, a uniform linear array consisting of 3 microphones (e.g., M=3 in FODMA 300 of FIG. 3) may be used for simulations and experiments. The spacing between neighboring microphones (δ) is 1 cm. Both the target and the designed beam patterns are plotted in FIGS. 5A-5D. The beam patterns are shown at f=1 kHz and $\theta_d=60°$. It is clearly shown in graph 500A that the designed and the target beam patterns are almost the same (e.g., the lines representing each beampattern on the graph 700A are indistinguishable from each other).

Figure 5B:
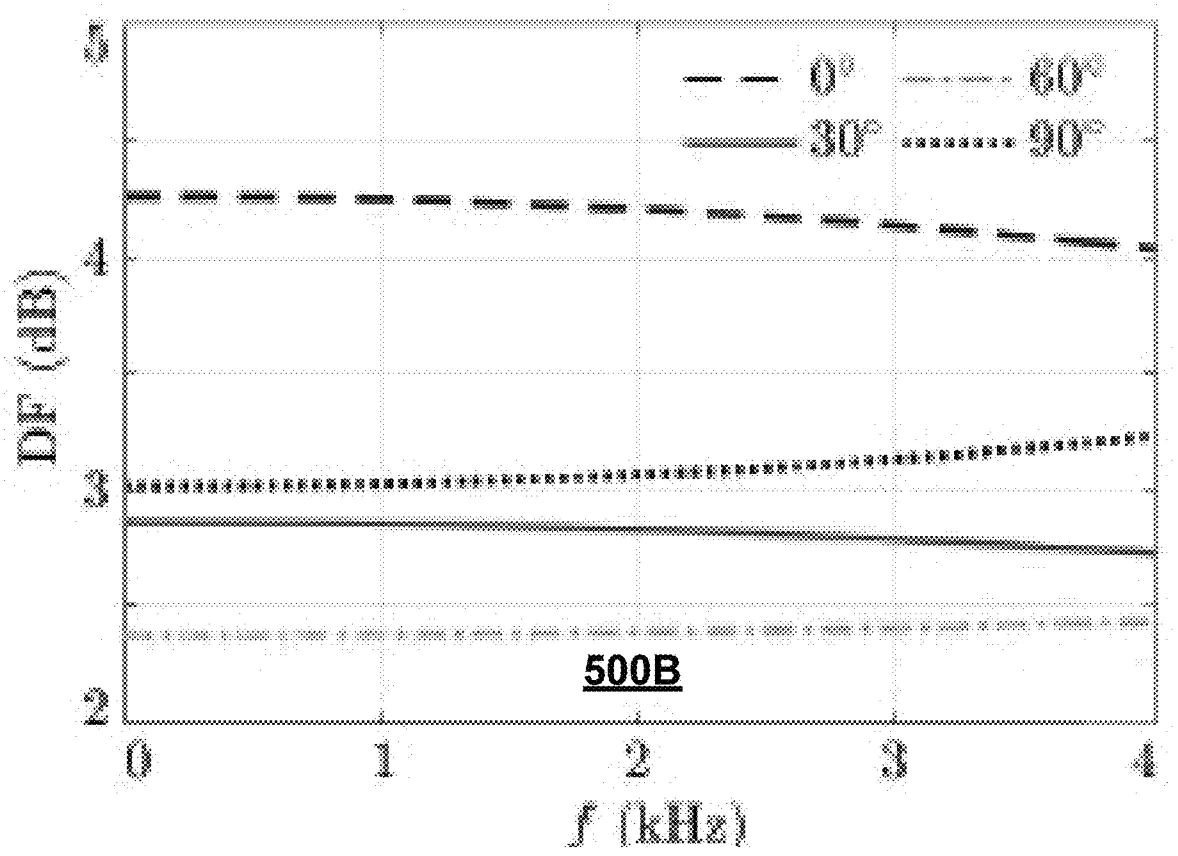
FIG. 5B shows a graph of DF values for the FODMA as a function of frequency, according to an implementation of the present disclosure.

FIG. 5B shows a graph 500B of DF values for the FODMA as a function of frequency, according to an implementation of the present disclosure.

It can be seen from graph 500B that for a particular value of $\theta_d$, the value of DF is almost constant over the studied frequency range. This property may be very important for processing wideband signals such as speech.

Figure 5C:
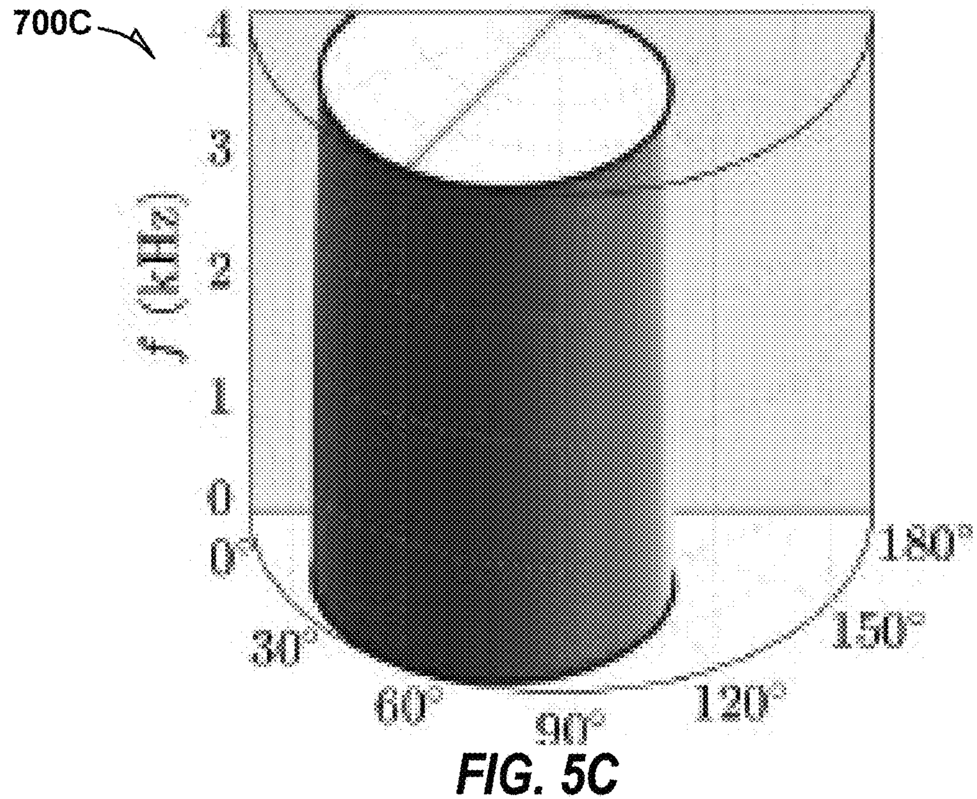
FIG. 5C shows a graph of a beampattern for the FODMA as a function of frequency, according to an implementation of the present disclosure.

FIG. 5C shows a graph 500C of a beampattern for the FODMA as a function of frequency, according to an implementation of the present disclosure.

The frequency independence of the designed beampattern is further verified by graph 500C, where the designed beampattern is frequency invariant.

Figure 5D:
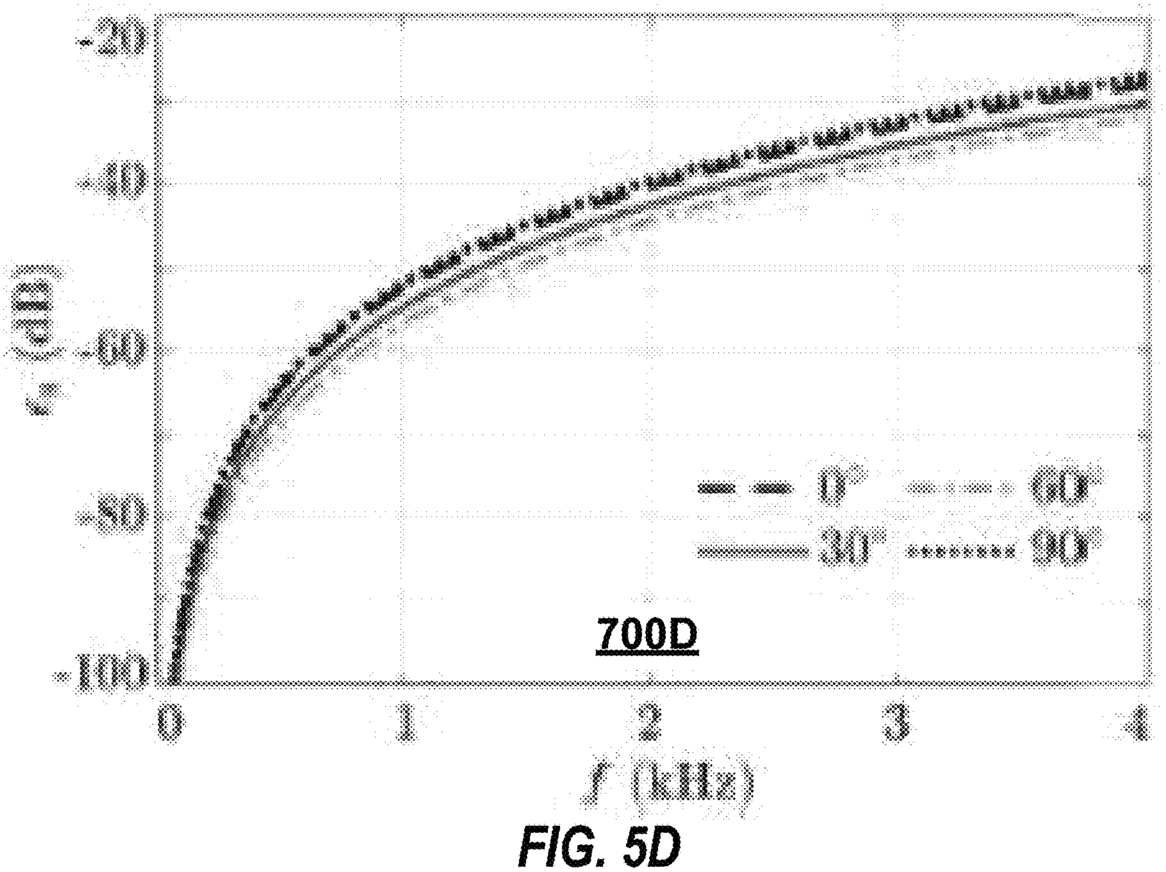
FIG. 5D shows a graph of approximation errors between the target beampattern for the FODMA and the steerable beamformer's beampattern as a function of frequency, according to an implementation of the present disclosure.

FIG. 5D shows a graph of approximation errors between the target beampattern for the FODMA and the steerable beamformer's beampattern as a function of frequency, according to an implementation of the present disclosure.

The distance between the designed beampattern and the target beampattern may be computed according to:

$$\epsilon_d=10\log_{10}\int_0^\pi|B_d(\theta)-B_1(\theta)|^2d\theta. \tag{36}$$

The results are plotted in graph 500D with conditions: $M_1=2$, $M_2=3$, and δ=1 cm. It may be readily seen that the difference between the designed beampattern and the target beampattern is very small in graph 500D.

Figure 6A:
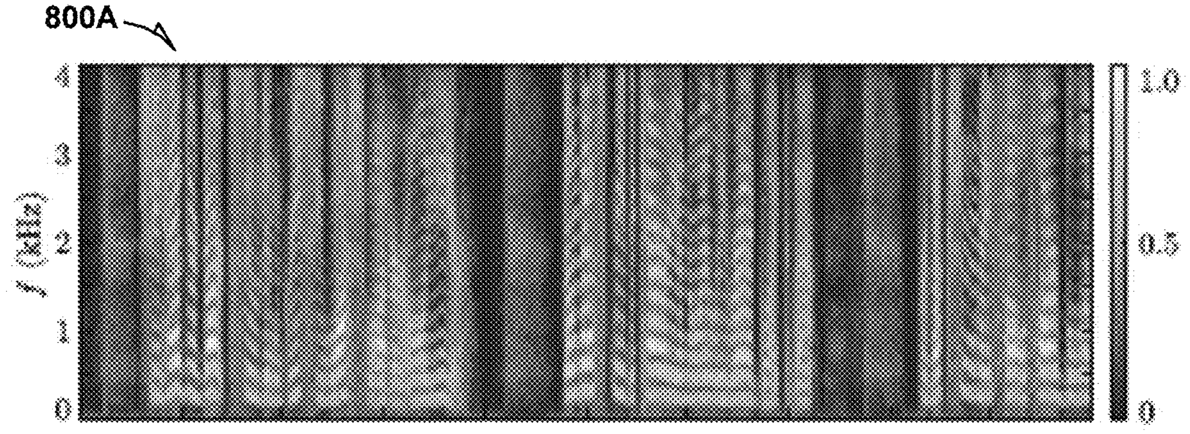
FIG. 6A shows a spectrogram of clean speech from the steerable beamformer with the speech source at a selected steering angle, according to an implementation of the present disclosure.

FIG. 6A shows a spectrogram 600A of clean speech from the steerable beamformer with the speech source at a selected steering angle, according to an implementation of the present disclosure.

Figure 6B:
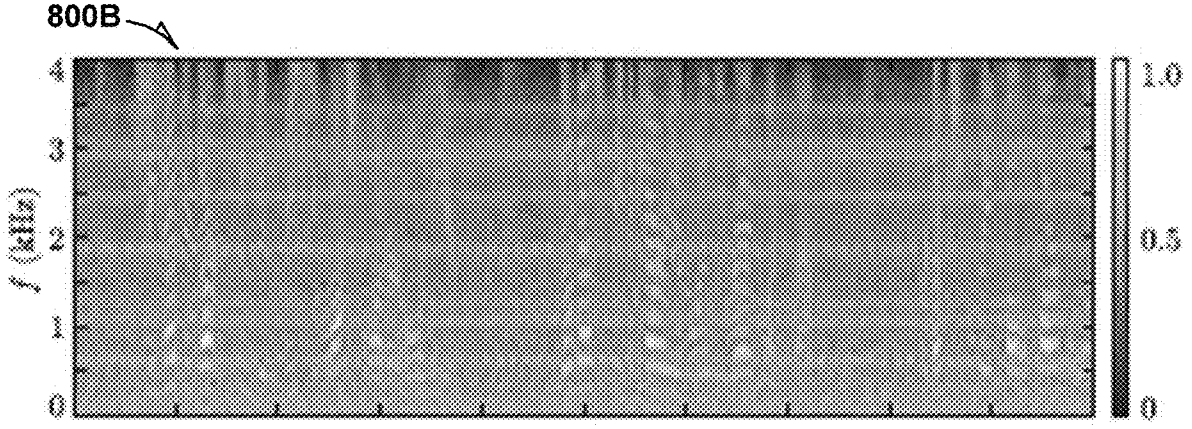
FIG. 6B shows a spectrogram of noisy speech signal from the steerable beamformer with the speech source at the selected steering angle, according to an implementation of the present disclosure.
Figure 6C:
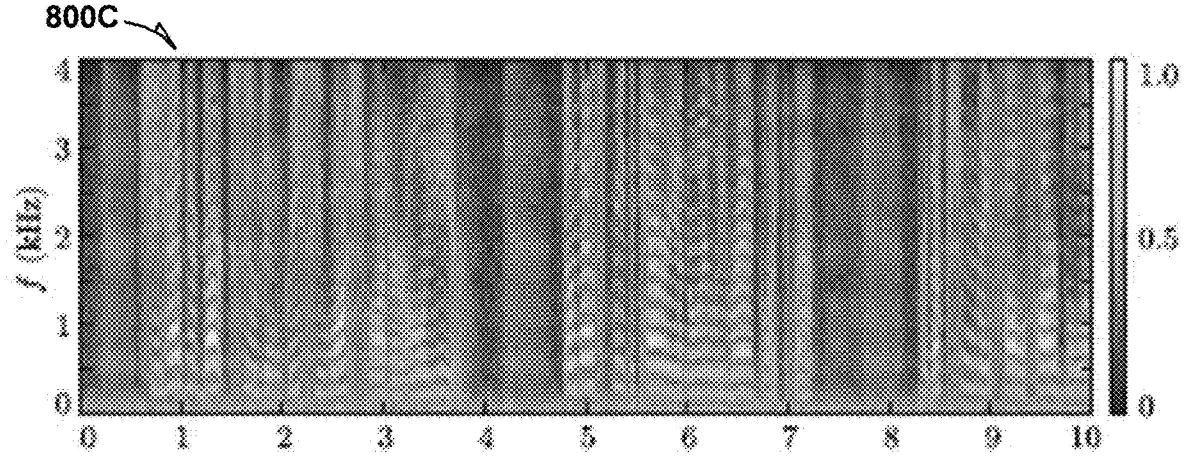
FIG. 6C shows a spectrogram of enhanced speech signal from the steerable beamformer with the speech source at a selected steering angle, according to an implementation of the present disclosure.

In another simulation (FIG. 6A-FIG. 6C), the described methods are evaluated by examining their speech enhancement performance. The same microphone array as in the previous simulation (see FIG. 5A-FIG. 5D) is used. The speech source (spoken by a female speaker), was taken from the TIMIT database of phonemically and lexically transcribed speech (see TIMIT acoustic phonetic continuous speech corpus. Linguistic Data Consort, 1993), is placed at $\theta_d$=60°. An automobile noise is placed at 180° (the endfire direction) to simulate a noise source. FIG. 6A-FIG. 6C plot the spectrograms of the clean speech, noisy speech, and the enhanced speech by the designed beamformer, respectively. In comparison with the noisy speech spectrum (see FIG. 6B), one can see that the noise is greatly reduced in the enhanced speech spectrum (see FIG. 6C). We use the signal-to-noise ratio (SNR) as the performance measure. When the input SNR is 5 dB, the output SNR after beamforming is 18.25 dB, which is in line with the theoretical results for speech enhancement with FODMAs.

FIG. 6B shows a spectrogram 600B of noisy speech signals from the steerable beamformer with the speech source at the selected steering angle, according to an implementation of the present disclosure.

FIG. 6C shows a spectrogram 600C of enhanced speech signals from the steerable beamformer with the speech source at a selected steering angle, according to an implementation of the present disclosure.

As noted above, FIG. 6A-FIG. 6C plot the spectrograms of the clean speech, noisy speech, and the enhanced speech by the designed beamformer, respectively. In comparison with the noisy speech spectrum (see FIG. 6B), one can see that the noise is greatly reduced in the enhanced speech spectrum (see FIG. 6C).

Figure 7A:
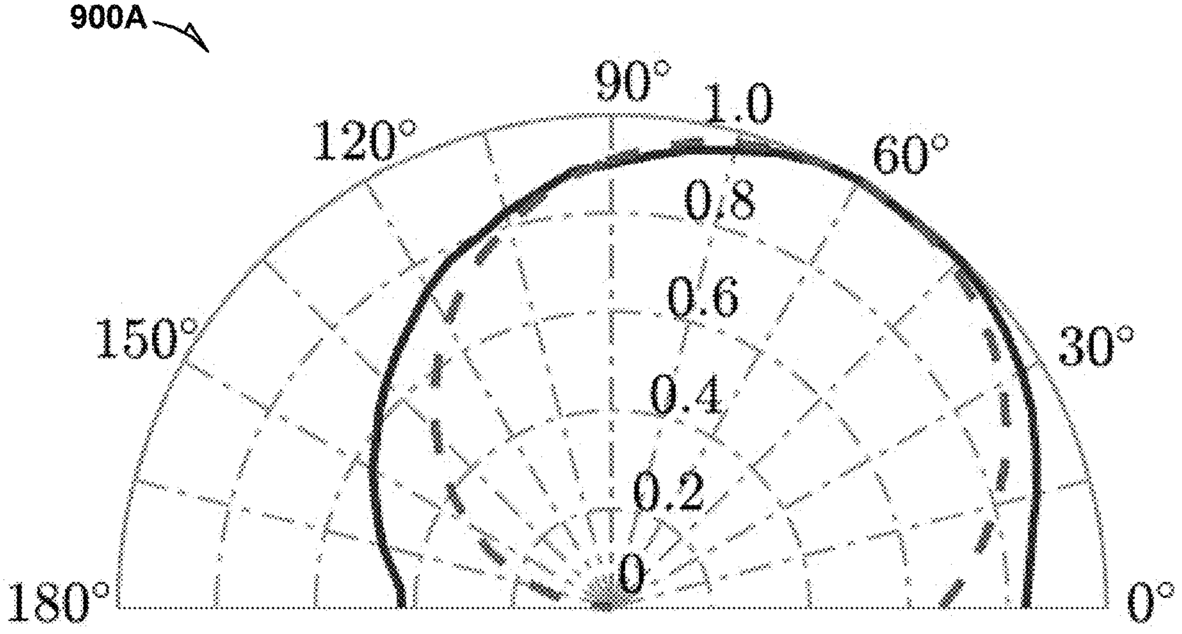
FIG. 7A shows a graph of the target beampattern for the FODMA and the steerable beamformer's beampattern, according to an implementation of the present disclosure.

FIG. 7A shows a graph 700A of the target beampattern for the FODMA and the steerable beamformer's beampattern, according to an implementation of the present disclosure.

To further verify the performance of the methods described herein, a uniform linear array consisting of 3 microphones is used. The uniform microphone spacing $\delta$ is 1.1 cm. The described beamforming algorithm was coded into the DSP processor of the designed FODMA system. This system was then tested on the top of a rotating platform in an anechoic chamber. A loudspeaker was put on the same level as the FODMA to simulate a sound source. The platform rotates clockwise at an interval of 5°. The beampattern is obtained by measuring the FODMA array gain at each angle based on the reference input signal (e.g. loudspeaker) and the beamforming output. The results at two different steering angles and frequencies are plotted in FIG. 7A and FIG. 7B. FIG. 7A has conditions: f=610 Hz and $\theta_d$=60°.

It is clear from graphs 700A and 700B that the measured beam patterns (solid lines) are close to the target beampattern (dashed lines) although there are some differences, which may be caused by multiple reasons, such as, measurement errors.

Figure 7B:
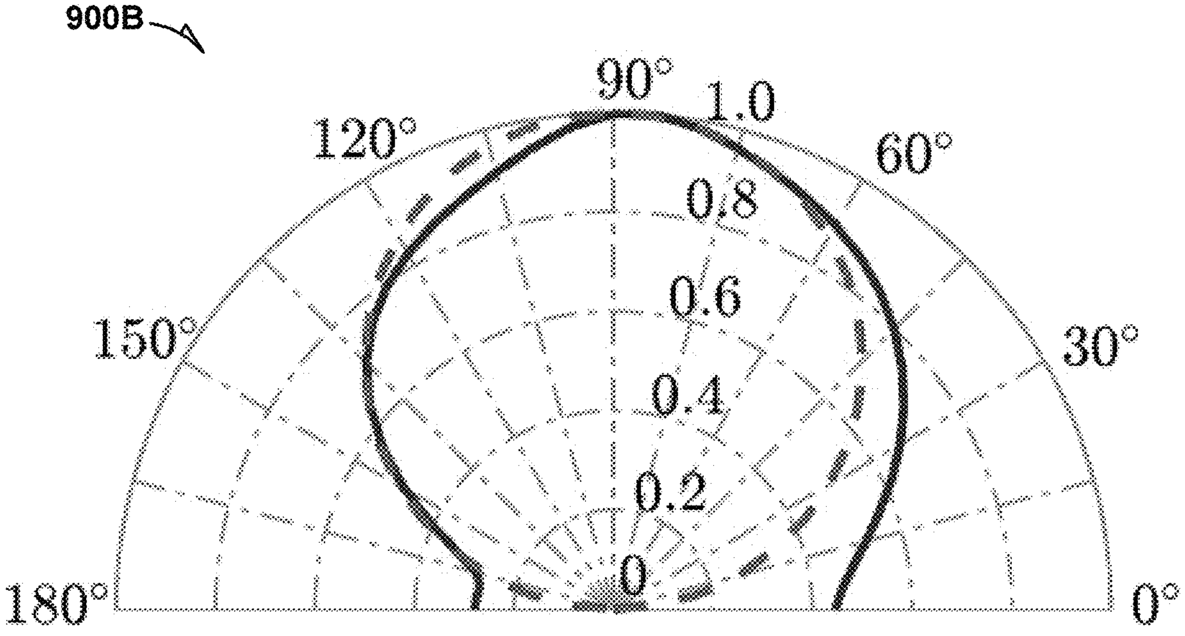
FIG. 7B shows a graph of the target beampattern for the FODMA and the steerable beamformer's beampattern, according to an implementation of the present disclosure.

FIG. 7B shows a graph 700B of the target beampattern for the FODMA and the steerable beamformer's beampattern, according to an implementation of the present disclosure.

Figure 8:
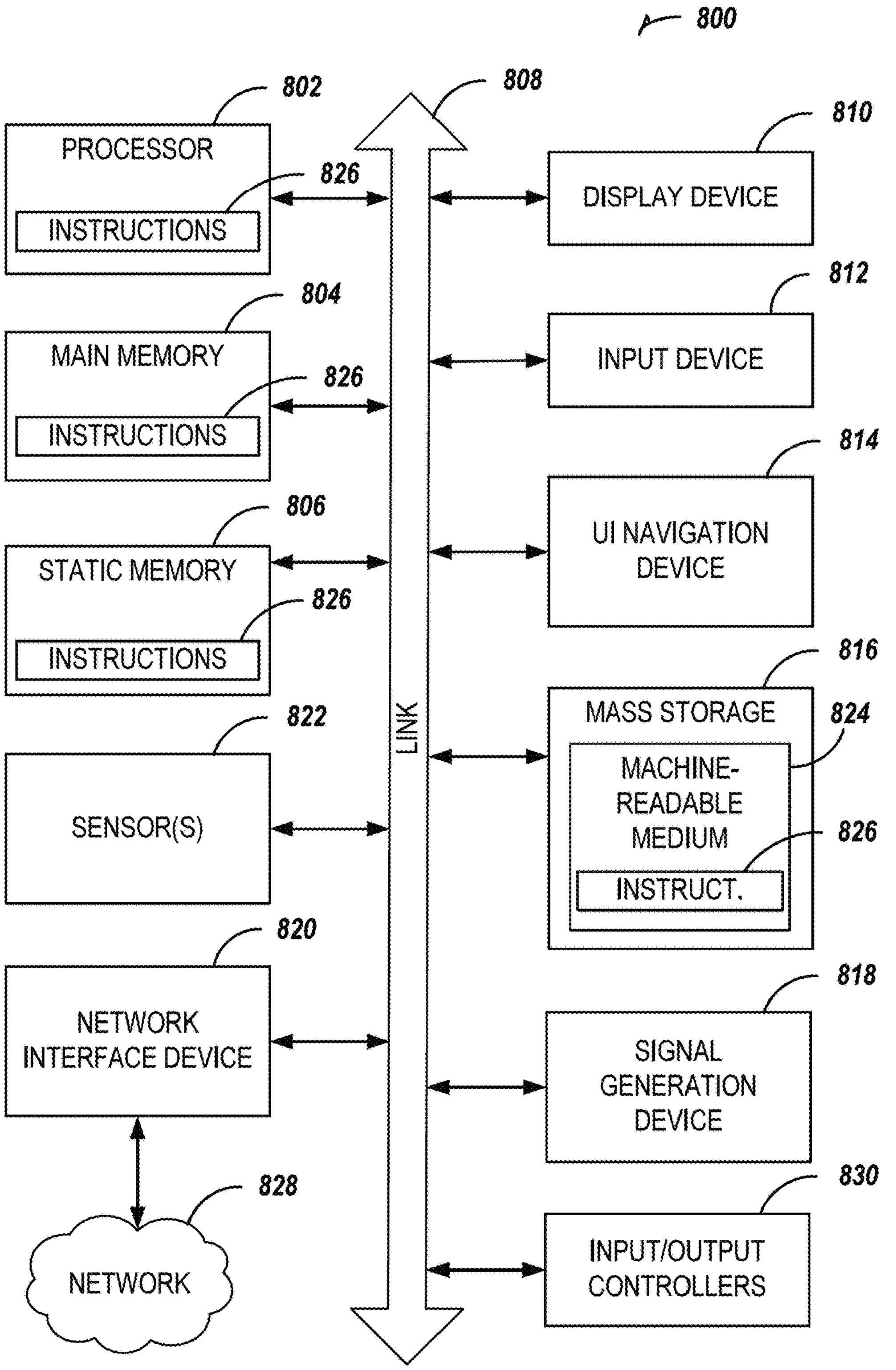
FIG. 8 is a block diagram illustrating a machine in the example form of a computer system, within which a set or sequence of instructions may be executed to cause the machine to perform any one of the methodologies discussed herein.

FIG. 7B has conditions: f=2100 Hz and $\theta_d$=90°. As noted above, it is clear from graphs 700A and 700B that the measured beam patterns (solid lines) are close to the target beampattern (dashed lines) although there are some differences, which may be caused by multiple reasons, for example, measurement errors FIG. 8 is a block diagram illustrating a machine in the example form of a computer system 800, within which a set or sequence of instructions may be executed to cause the machine to perform any of the methodologies discussed herein.

In alternative implementations, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one implementation, the display device 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors 822, such as a global positioning system (GPS) sensor, compass, accelerometer, gyrometer, magnetometer, or other sensor.

The storage device 816 includes a machine-readable medium 824 on which is stored one or more sets of data structures and instructions 826 (e.g., software) embodying or utilized by any one or more of the methodologies or functions described herein. The instructions 826 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 824 is illustrated in an example implementation to be a single medium, the term "machine-readable medium" may include a single medium or multiple media (e.g., a centralized or distributed database, and/or associated caches and servers) that store the one or more instructions 826. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. Specific examples of machine-readable media include volatile or non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 826 may further be transmitted or received over a communications network 828 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). Input/output controllers 830 may receive input and output requests from the central processor 802, and then send device-specific control signals to the devices they control (e.g., display device 810). The input/output controllers 830 may also manage the data flow to and from the computer system 800. This may free the central processor 802 from involvement with the details of controlling each input/output device.

Language

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method for constructing a first-order differential microphone array (FODMA) with a steerable beamformer, the method comprising:

specifying, by a processing device, a target beampattern for the FODMA at a steering angle $\theta$;

decomposing, by the processing device, the target beampattern into a first sub-beampattern and a second sub-beampattern based on the steering angle $\theta$;

generating, by the processing device, a first sub-beamformer and a second sub-beamformer to each filter signal from microphones of the FODMA, wherein the first sub-beamformer is associated with the first sub-beampattern, and the second sub-beamformer is associated with the second sub-beampattern; and generating, by the processing device, the steerable beamformer based on the first sub-beamformer and the second sub-beamformer.

2. The method of claim 1, wherein the steering angle $\theta \in [0, \pi]$.

3. The method of claim 1, wherein the decomposing, by the processing device, of the target beampattern into a first sub-beampattern and a second sub-beampattern further comprises: dividing the target beampattern into a sum of a first-order cosine (cardioid) first sub-beampattern and a first-order sinusoidal (dipole) second sub-beampattern.

4. The method of claim 1, wherein generating, by the processing device, a first sub-beamformer and a second sub-beamformer to each filter signals from microphones of the FODMA further comprises: the second sub-beamformer filtering squared signals from the microphones of the FODMA to substantially match the second sub-beampattern.

5. The method of claim 4, further comprising: the second sub-beamformer ignoring any signal correlation in filtering the squared signals from the microphones of the FODMA to substantially match the second sub-beampattern.

6. The method of claim 1, wherein generating, by the processing device, the steerable beamformer based on the first sub-beamformer and the second sub-beamformer further comprises: generating the steerable beamformer based on a spectral phase of the filtered signals from the first sub-beamformer.

7. The method of claim 1, further comprising: organizing the microphones of the FODMA as a uniform linear differential microphone array (LDMA) with the microphones equally spaced along a straight line.

8. A first-order differential microphone array (FODMA) system with a steerable beamformer, the system comprising:
- microphones located on a substantially planar platform; and
- a processing device, communicatively coupled to the microphones, configured to:
  - specify a target beampattern for the FODMA at a steering angle θ;
  - decompose the target beampattern into a first sub-beampattern and a second sub-beampattern based on the steering angle θ;
  - generate a first sub-beamformer and a second sub-beamformer to each filter signals from the microphones, wherein the first sub-beamformer is associated with the first sub-beampattern, and the second sub-beamformer is associated with the second sub-beampattern; and
  - generate the steerable beamformer based on the first sub-beamformer and the second sub-beamformer.

9. The FODMA system of claim 8, wherein the steering angle $\theta \in [0, \pi]$.

10. The FODMA system of claim 8, wherein the processing device is further configured to: divide the target beampattern into a sum of a first-order cosine (cardioid) first sub-beampattern and a first-order sinusoidal (dipole) second sub-beampattern.

11. The FODMA system of claim 8, wherein the processing device is further configured to: filter squared signals from the microphones with the second sub-beamformer to substantially match the second sub-beampattern.

12. The FODMA system of claim 11, wherein the processing device is further configured to: ignore any signal correlation in filtering the squared signals from the microphones with the second sub-beamformer to substantially match the second sub-beampattern.

13. The FODMA system of claim 8, wherein the processing device is further configured to: generate the steerable beamformer based on a spectral phase of the filtered signals from the first sub-beamformer.

14. The FODMA system of claim 8, wherein the microphones of the FODMA are configured as a uniform linear differential microphone array (LDMA) with the microphones equally spaced along a straight line.

* * * * *